United States Patent [19]
Peterson et al.

[11] Patent Number: 5,950,439
[45] Date of Patent: Sep. 14, 1999

[54] METHODS AND SYSTEMS FOR CONTROLLING A REFRIGERATION SYSTEM

[75] Inventors: Gregory Eric Peterson, Sylvan Lake; Christian Jens Andersen, Cadillac, both of Mich.

[73] Assignee: Nartron Corporation, Reed City, Mich.

[21] Appl. No.: 08/786,019

[22] Filed: Jan. 21, 1997

[51] Int. Cl.$^6$ .............................. F04B 49/00; F25B 1/00
[52] U.S. Cl. .................... 62/80; 62/230; 417/22
[58] Field of Search .................... 62/186, 228.4, 62/154, 230; 417/22

[56] References Cited

U.S. PATENT DOCUMENTS

| | | | |
|---|---|---|---|
| 3,196,629 | 7/1965 | Wood | 62/183 |
| 5,515,692 | 5/1996 | Sterber et al. | 62/154 |
| 5,669,225 | 9/1997 | Beaverson et al. | 62/228.4 |
| 5,709,098 | 1/1998 | Itoh et al. | 62/230 X |
| 5,709,533 | 1/1998 | Dias | 62/186 |

*Primary Examiner*—William Wayner
*Attorney, Agent, or Firm*—Brooks & Kushman, P.C.

[57] ABSTRACT

A method and system for controlling a refrigeration system is operative to reduce a system pressure of the refrigeration system. The system pressure is reduced to reduce a start-up current associated with a compressor motor of the refrigeration system. Another method and system for controlling a refrigeration system includes steps of performing an operation of the refrigeration system in accordance with at least one parameter, sensing an amount of energy utilized in at least a portion of the refrigeration system to perform the operation, and modifying the at least one parameter to reduce the amount of energy required to subsequently perform the operation.

9 Claims, 7 Drawing Sheets

METHODS AND SYSTEMS FOR CONTROLLING A REFRIGERATION SYSTEM

TECHNICAL FIELD

The present invention relates to methods and systems for controlling a refrigeration system.

BACKGROUND OF THE INVENTION

Refrigeration systems are utilized to produce a lower temperature in a predetermined space, such as within a chamber or a room, relative to an ambient temperature. In many refrigeration systems, temperatures lower than ambient are achieved through the compression and expansion of a refrigerant. In particular, an evaporator transfers heat from the predetermined space or its contents to a refrigerant in a vaporized state. The vaporized refrigerant is communicated to a compressor. The compressor increases the pressure of the vaporized refrigerant, which acts to increase the temperature of the vaporized refrigerant. A condenser transfers heat from the refrigerant, typically to the ambient environment, causing the refrigerant to condense to a liquid form. The liquid form of the refrigerant is communicated to an input of an expansion valve which reduces the pressure and temperature of the refrigerant. The refrigerant, back in a vaporized form, is communicated from an output of the expansion valve back to the evaporator. The refrigerant is communicated within the refrigeration system using tubing or like plumbing components.

A number of issues are involved in controlling a refrigeration system. These issues include: how to control motors associated with the refrigeration system (e.g. a compressor motor); how to define and control a refrigeration cycle; and how to define and control a defrost cycle.

SUMMARY OF THE INVENTION

The present invention provides a method for controlling a refrigeration system having a compressor motor. The method includes a step of reducing a system pressure of the refrigeration system to reduce a start-up current associated with the compressor motor. A system which performs the above-described step is also provided.

The present invention further provides a method of controlling a refrigeration system which comprises the steps of performing an operation of the refrigeration system in accordance with at least one parameter, sensing an amount of energy utilized or stored in at least a portion of the refrigeration system to perform the operation, and modifying the at least one parameter to reduce the amount of energy required to subsequently perform the operation. A system which performs the above-described steps is also provided.

These and other features, aspects, and advantages of the present invention will become better understood with regard to the following description, appended claims, and accompanying drawings.

DETAILED DESCRIPTION OF A PREFERRED EMBODIMENT

Figure 1:
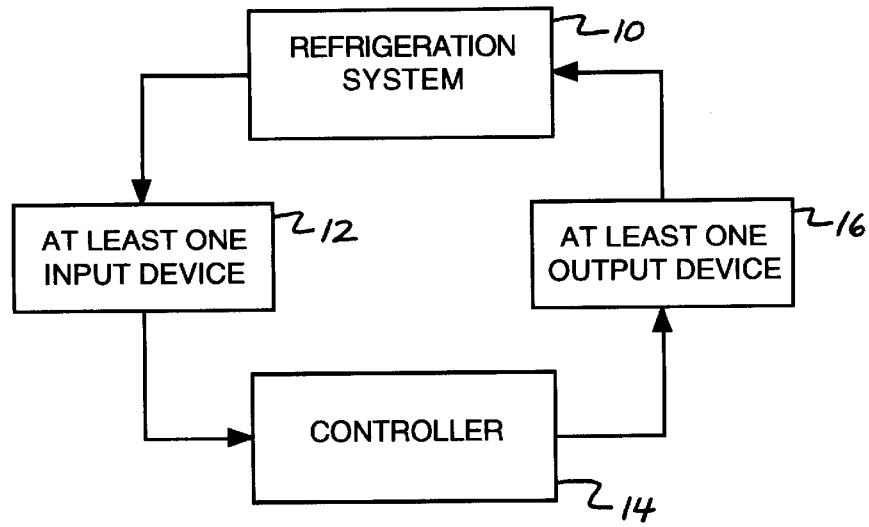
FIG. 1 is a block diagram of an embodiment of a system for controlling a refrigeration system in accordance with the present invention.

FIG. 1 is a block diagram of an embodiment of a system for controlling a refrigeration system 10 in accordance with the present invention. The system includes at least one input device 12. The at least one input device 12 produces at least one signal associated with at least one parameter of the refrigeration system 10. Examples of the at least one input device 12 include, but are not limited to, any combination of: a temperature adjustment input device for adjusting a desired temperature within a chamber of refrigeration system 10; a line signal sensor which senses a line signal used to power the refrigeration system 10; an ambient temperature sensor which senses a temperature in an ambient environment to the refrigeration system 10; a door sensor to sense the opening and closing of a door to the chamber of the refrigeration system 10; a temperature sensor which senses a temperature within the chamber of the refrigeration system 10; a humidity sensor which senses a humidity within the chamber; a sensor which senses a condition of a motor in the refrigeration system 10; and a pressure sensor which senses a system pressure in the refrigeration system 10.

The control system further includes a controller 14. The controller 14 processes signals received from the at least one input device 12 to produce at least one control signal. The controller 14 can be embodied by an electronically-programmable microprocessor, a microcontroller, an application-specific integrated circuit, or a like device to provide a predetermined control logic.

The at least one control signal is applied to at least one output device 16 to control at least one operative parameter of the refrigeration system 10. Examples of the at least one output device 16 include, but are not limited to, any combination of: a driver for a compressor motor; a driver for an evaporator fan motor; a driver for a condenser fan motor; a driver for a defrost bar; an expansion device for restricting a flow of refrigerant in the refrigeration system; and an indicator device.

The controller 14 controls the at least one operative parameter of the refrigeration system 10 in accordance with at least one predetermined algorithm. The at least one operative parameter is controlled by the controller 14 to achieve one or more predetermined goals for operation of the refrigeration system. Examples of goals for operation are as follows.

One goal is to reduce an amount of energy required to refrigerate items contained in the chamber of the refrigeration system 10. Reducing the energy required to a near-minimal amount advantageously lowers the cost of operating the refrigeration system 10.

Another goal is to protect system components from avoidable damage. For example, it is desirable to protect a compressor motor from failing when started with a high head pressure applied to the compressor.

A further goal is to improve the response of the refrigeration system 10. Here, the operation of the refrigeration system 10 can be modified under some conditions to enhance a response recognizable by a user. For example, at extreme conditions, an enhanced cooling operation can be commanded to achieve a reduced cooling time. This allows the use of a higher-efficiency, lower-capacity system to perform a desired task.

A still further goal is to improve the performance of the refrigeration system 10. Here, for example, the operation of the refrigeration system 10 is controlled to maximize the work done thereby relative to the amount of energy used. As a result, reduced-sized components and/or lower-cost components can be utilized to provide the same system performance.

A yet still further goal is to improve the reliability of components. Here, for example, the operation of the refrigeration system 10 is controlled to improve the length of life of components by reducing wasted operation time.

An additional goal is to reduce one or more user annoyance factors such as a level of sound produced by the refrigeration system 10, an amount of heat produced by the refrigeration system 10, or a likelihood of spoilage of items in the refrigeration system 10.

Another goal is to detect failure of components and provide an indication thereof. Here, for example, the system notifies a user or a service person of a specific component failure. This allows for faster diagnosis and repair of the system.

Methods for controlling the at least one output device 16 to achieve these goals are described with reference FIGS. 3 to 12. Of particular interest are methods of controlling the refrigeration system 10 by reducing a system pressure, such as a compressor head pressure, to reduce a start-up current associated with a compressor motor. The step of reducing the system pressure acts to reduce the system pressure to a predetermined level prior to actuation of the compressor motor. The step of reducing the system pressure can include actuating a condenser fan motor, actuating an evaporator motor, and/or controlling an expansion device prior to actuating the compressor motor. Thereafter, the condenser fan motor, the evaporator motor, and/or the expansion device can be controlled during start-up of the compressor motor to reduce the system pressure while the compressor motor is actuated. After start-up, the condenser fan motor, the evaporator motor, and/or the expansion device can be controlled to reduce a steady-state operational power of the compressor motor.

Before describing the methods in detail, an additional embodiment of a system for controlling a refrigeration system is described with reference to FIG. 2.

Figure 2:
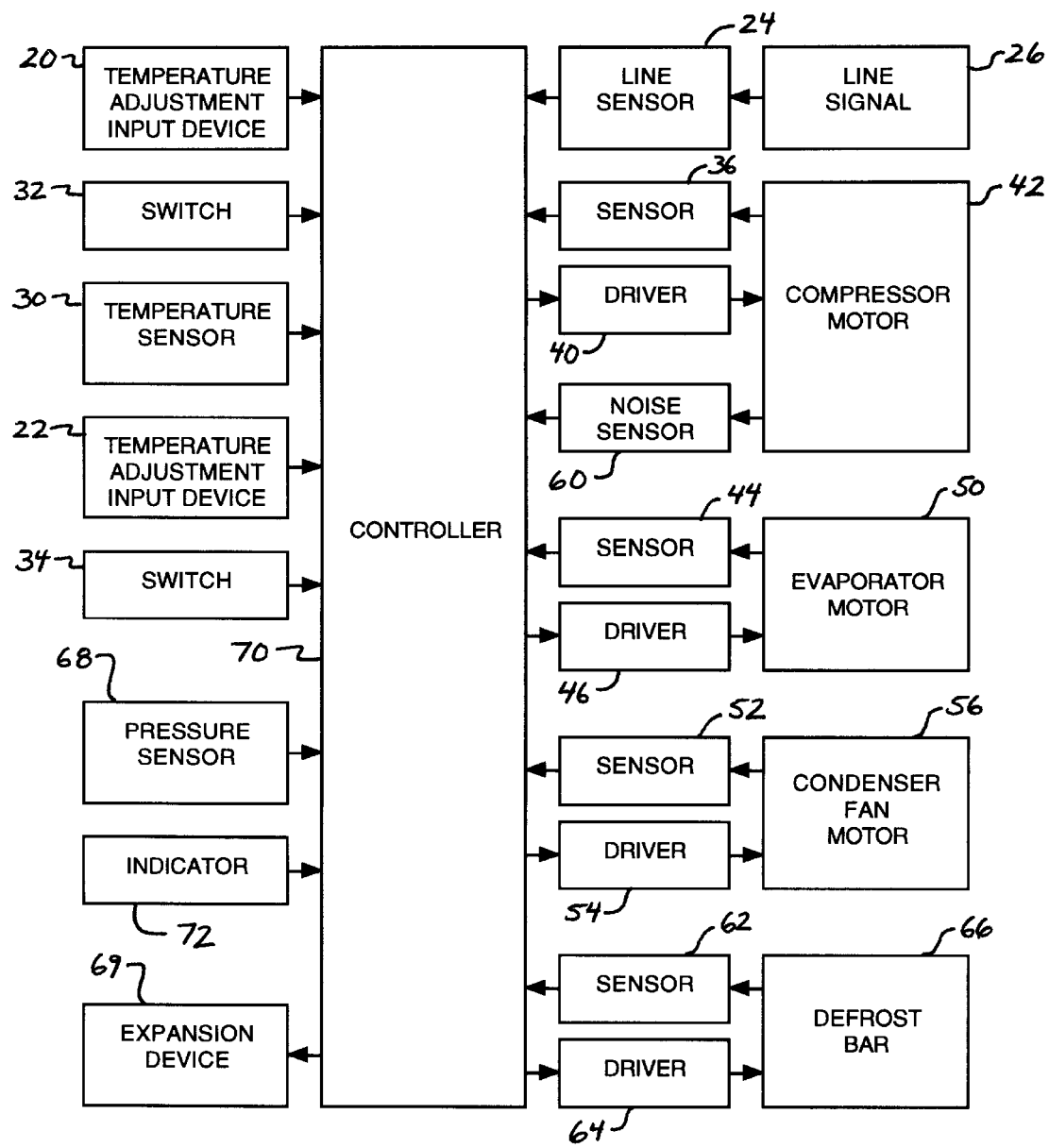
FIG. 2 is a block diagram of another embodiment of a system for controlling a refrigeration system.

FIG. 2 is a schematic block diagram of another embodiment of a system for controlling a refrigeration system. In this embodiment, the refrigeration system includes a first chamber and a second chamber. The first chamber is typically utilized to refrigerate items at a temperature above freezing, while the second chamber is utilized to refrigerate items at a temperature at or below freezing.

The system includes a temperature adjustment input device 20 which allows an operator to adjust a desired temperature within the first chamber. The temperature adjustment input device 20 can include a variable resistor whose resistance is varied in dependence upon the desired temperature. It is noted, however, that alternative input devices can be utilized for the temperature adjustment input device 20.

Optionally, the system further includes a temperature adjustment input device 22 which allows an operator to adjust the temperature within the second chamber. The temperature adjustment input device 22 can also include a variable resistor whose resistance is varied in dependence upon the desired temperature, though alternative input devices can be utilized.

The system includes a line sensor 24 which senses a signal 26 which powers the refrigeration system. The signal 26 typically includes an alternating current signal, though embodiments of the present invention can also sense a direct current powering signal. Under normal operation, the alternating current signal provides a voltage in the range of 90–130 VAC or in the range of 140–260 VAC. The alternating current signal has a frequency, under normal operation, of between 45 Hz and 65 Hz.

The system includes a temperature sensor 30 which senses either an ambient temperature or a temperature within the first chamber or the second chamber of the refrigeration system. The temperature sensor 30 can include a resistor whose resistance varies in dependence upon the temperature. It is noted, however, that various types of temperature sensors can be utilized in the system.

Optionally, the system includes a first switch 32 which detects if a door to the first chamber is open or closed. As a further option, a second switch 34 is included to detect if a door to the second chamber is open or closed.

The system includes a sensor 36 and a driver 40 for a compressor motor 42. Generally, the compressor motor 42 includes either an AC motor or a DC motor utilized to circulate refrigerant within the refrigeration system. The sensor 36 senses a parameter of the compressor motor 42 and generates a signal associated therewith. The driver 40 is utilized to drive the compressor motor 42 based upon a control signal applied thereto. In a preferred embodiment, the compressor motor 42 includes a variable-speed compressor or a multiple-speed compressor whose speed is modified in dependence upon the control signal applied to the driver 40. It is noted, however, that the compressor motor 42 can include a single-speed motor if desired.

Similarly, the system includes a sensor 44 and a driver 46 for an evaporator fan motor 50. Generally, the evaporator fan motor 50 includes either an AC motor or a DC motor utilized to move a fluid, such as air, through a low temperature heat transfer device (i.e. an evaporator). This process acts to transfer heat from the chamber and items therein to the refrigerant in the evaporator.

The sensor 44 senses a parameter of the evaporator fan motor 50 and generates a signal associated therewith. The driver 46 is utilized to drive the evaporator fan motor 50 based upon a control signal applied thereto. In a preferred embodiment, the evaporator fan motor 50 includes a variable-speed motor or a multiple-speed motor whose speed is modified in dependence upon the control signal applied to the driver 46. It is noted, however, that the evaporator fan motor 50 can include a single-speed motor if desired.

The system also includes a sensor 52 and a driver 54 for a condenser fan motor 56 or a plurality of condenser fan motors. Generally, the condenser fan motor 56 includes either an AC motor or a DC motor utilized to move a fluid, such as air, through a high temperature heat transfer device (i.e. a condenser) to remove heat from the refrigerant. The removed heat is transferred out of the refrigeration system to the ambient environment.

The sensor 52 senses a parameter of the condenser fan motor 56 and generates a signal associated therewith. The driver 54 is utilized to drive the condenser fan motor 56 based upon a control signal applied thereto. The condenser fan motor 56 can include a single-speed motor, a multiple-speed motor, or a variable-speed motor whose speed is modified in dependence upon the control signal applied to the driver 54.

Optionally, the system includes a noise sensor 60 to sense a noise level associated with at least one motor. As illustrated, it is preferred that the noise sensor 60 sense a noise level associated with the compressor motor 42. The noise can include audible noise and/or mechanical vibration. As such, the noise sensor 60 can include an audio transducer and/or a vibration sensor. Regardless of its form, the noise sensor 60 generates a signal associated with the noise level.

Optionally, the system includes a sensor 62 and a driver 64 for a defrost bar 66. The sensor 62 senses a parameter of the defrost bar 66 and generates a signal associated therewith. The driver 64 is utilized to drive the defrost bar 66 based upon a control signal applied thereto.

Optionally, the system includes a pressure sensor 68 which senses a system pressure associated with the refrigeration system and generates a signal associated therewith. Preferably, the pressure sensor 68 is situated to sense a head pressure applied to the compressor.

As another option, the system includes an expansion device 69. The expansion device 69 can comprise an electronically-controlled flow device or a variable orifice valve having at least one dimension which can be varied in response to an input signal. The expansion device 69 can be utilized to compensate for varying conditions to improve system performance and to reduce a possibility of having liquid refrigerant returning to the compressor.

The above-described components communicate with a controller 70. The controller 70 receives signals from the temperature adjustment input devices 20 and 22, the line sensor 24, the temperature sensor 30, the first switch 32, the second switch 34, the sensor 36, the sensor 44, the sensor 52, the noise sensor 60, the sensor 62, and the pressure sensor 68. The controller 70 processes these signals in accordance with at least one predetermined algorithm to form control signals for application to the driver 40, the driver 46, the driver 54, the driver 64, the expansion device 69, and an optional indicator 72.

The at least one predetermined algorithm can be utilized to: (i) read an ambient temperature and the defrost bar 66 to establish an adaptive defrost algorithm which reduces an energy required to perform a defrost cycle; (ii) monitor an input line voltage for both missing cycles and average voltage levels to establish an efficient operation of the compressor motor 42; (iii) adapt the refrigeration system to an efficient operating mode based upon the ambient temperature; (iv) continuously monitor a motor to verify its operation, and take protective action to prevent potential compressor failure and wasted energy if motor overload occurs; and (v) monitor temperature settings and adjust the control of the refrigeration system based thereupon.

If desired, the controller 70, the temperature sensor 30, the sensors 36 and 44, the drivers 40 and 46, as well as any additional operator inputs for desired temperatures and defrost timing can be integrated onto a single circuit board assembly.

The indicator 72 provides an audible or a visual indication which identifies a degradation or a failure of a component of the refrigeration system. The indicator 72 is amenable for use in preventative maintenance applications, and preferably, for rapid component identification and replacement.

The system is operative to withstand a line voltage decrease from a normal voltage to a voltage significantly less than the normal voltage for a predetermined period of time. For example, the system can be designed to withstand a line voltage decrease to less than 50% of the normal voltage for a time duration less than 0.5 seconds. If a power outage condition beyond this case occurs, a reinitialization step is performed.

FIGS. 3 to 12 provide embodiments of algorithms for controlling a refrigeration system. The algorithms can be directed using the controller 14 of FIG. 1 or the controller 70 of FIG. 2. It is noted that the controller can perform any combination of the algorithms described hereinafter, including all of the algorithms if desired.

Figure 3:
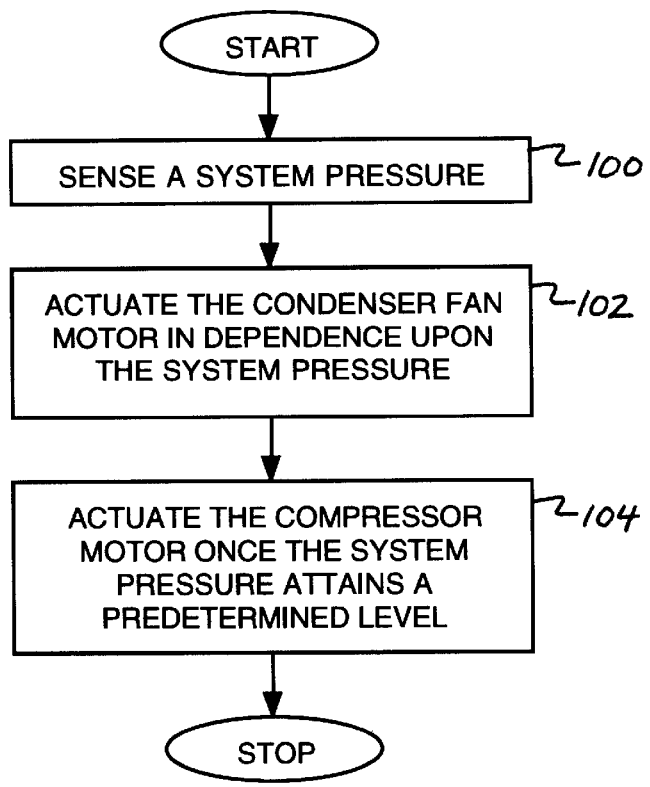
FIG. 3 is a flow chart of a first method of controlling a refrigeration system in accordance with the present invention.

FIG. 3 is a flow chart of a first method of controlling a refrigeration system in accordance with the present invention. As indicated by block 100, the method includes a step of sensing a system pressure in the refrigeration system. Preferably, this step includes sensing a compressor head pressure. The system pressure can be sensed using the pressure sensor 68 shown in FIG. 2.

As indicated by block 102, the method includes a step of actuating the condenser fan motor in dependence upon the system pressure. Preferably, the condenser fan motor is actuated to reduce the compressor head pressure below a predetermined level prior to actuating a compressor motor. The condenser fan motor can be actuated by providing an actuation signal to the driver 54.

As indicated by block 104, the method includes a step of actuating the compressor motor once the system pressure attains the predetermined level. The compressor motor can be actuated by providing an actuation signal to the driver 40. Preferably, the compressor motor is actuated once the compressor head pressure is below the predetermined level. As a result, the start-up current associated with the compressor motor is reduced.

This method advantageously reduces or eliminates the need for a motor start capacitor, a thermal overload switch, and/or a filter capacitor associated with the compressor motor. Further, this method is operative to reduce audible and electrical noise generated by the refrigeration system at start-up, and to increase the life of the compressor motor.

Figure 4:
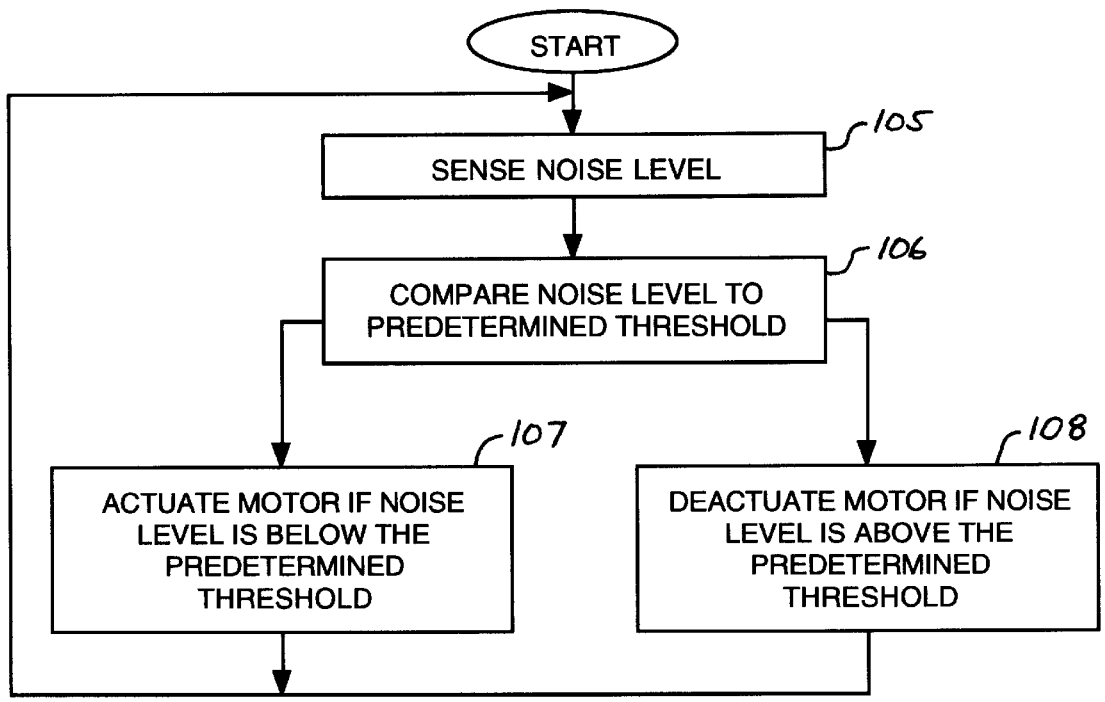
FIG. 4 is a flow chart of a second method of controlling a refrigeration system in accordance with the present invention.

FIG. 4 is a flow chart of a second method of controlling a refrigeration system in accordance with the present invention. As indicated by block 105, the method includes a step of sensing a noise level during start-up. The noise can be produced by any one or more motors in the refrigeration system. In a preferred embodiment, however, the noise produced by the compressor motor is sensed. The noise can include audible noise and/or mechanical vibrations.

As indicated by block 106, the method includes a step of comparing the noise level to a predetermined threshold. As indicated by block 107, a step of actuating a motor is performed if the noise level is less than the predetermined threshold. As indicated by block 108, a step of de-actuating the motor is performed if the noise level is greater than the predetermined threshold in dependence upon the noise. Preferably, the motor which is actuated and de-actuated includes the compressor motor.

After actuating or de-actuating the motor, flow of the method is directed back to the step of sensing the noise level indicated by block 105. The method can be utilized to regulate the motor during start-up.

It is noted that the method described with reference to FIG. 4 can be performed alone, or in conjunction with the method described with reference to FIG. 3.

Figure 5:
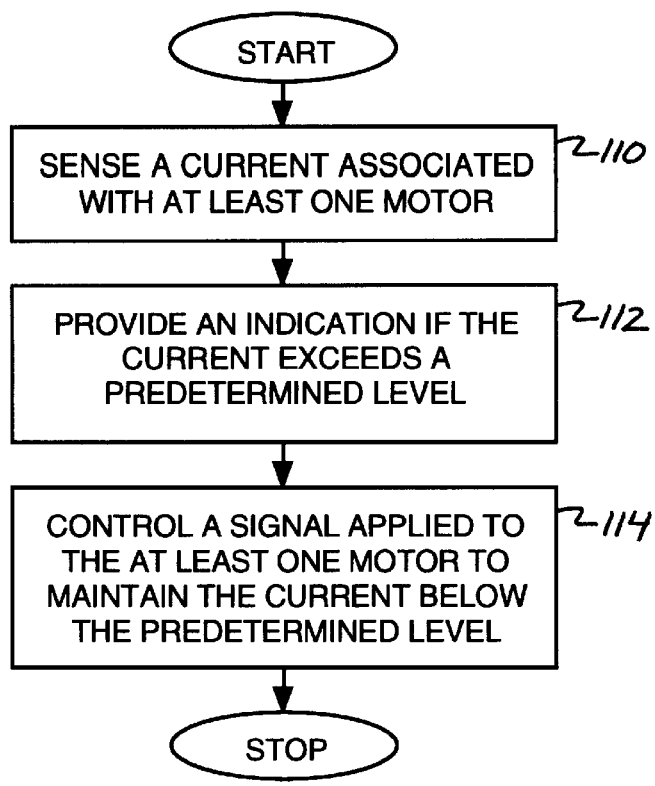
FIG. 5 is a flow chart of a third method of controlling a refrigeration system in accordance with the present invention.

FIG. 5 is a flow chart of a third method of controlling a refrigeration system in accordance with the present invention. This method advantageously provides a warning if the start-up current associated with either the condenser fan motor, the compressor motor, or the evaporator fan motor is excessive.

As indicated by block 110, the method includes a step of sensing a current associated with at least one motor in the refrigeration system. Preferably, the current is sensed at start-up for the at least one motor. The at least one motor can include the condenser fan motor, the evaporator fan motor, and/or the compressor motor or any combination of motors. As such, the current can be sensed using any of the sensors 36, 44, and 52 illustrated in FIG. 2.

As indicated by block 112, the method includes a step of providing an indication if the current exceeds a predetermined level. Generally, the indication can be either an audible indication or a visual indication which provides a diagnostic warning of a potentially-failed motor. The indication can be provided by applying a suitable signal to the indicator 72 in FIG. 2.

Each of the condenser fan motor, the compressor motor, and the evaporator fan motor can have a respective current threshold associated therewith for comparing to the sensed current. Additionally, each motor can have a unique indication associated therewith to facilitate rapid component identification and replacement.

Additionally, as indicated by block 114, the method can include a step of controlling a control signal applied to the at least one motor to maintain the current below the predetermined level. Here, it is preferred that at least one of the condenser fan motor, the compressor motor, and the evaporator fan motor be controlled so that the current is maintained below its respective current threshold. This step can be utilized to eliminate the motor start capacitor, or reduce the magnitude of the motor start capacitor, associated with each motor.

Figure 6:
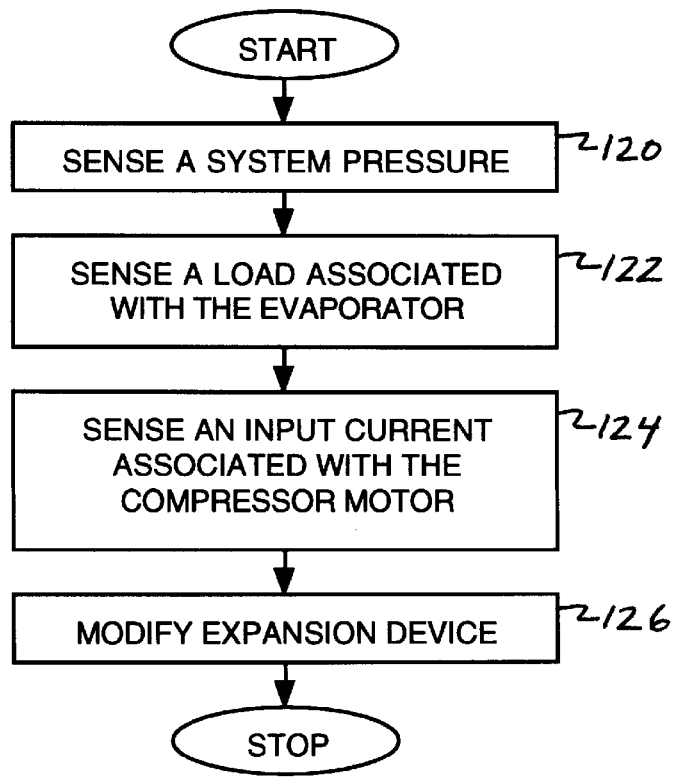
FIG. 6 is a flow chart of a fourth method of controlling a refrigeration system in accordance with the present invention.

FIG. 6 is a flow chart of an embodiment of a fourth method of controlling a refrigeration system in accordance with the present invention. As indicated by block 120, the method includes a step of sensing a system pressure associated with the refrigeration system. Preferably, this step includes sensing a compressor head pressure using the pressure sensor 68.

As indicated by block 122, the method includes a step of sensing a load associated with the evaporator of the refrigeration system. This step can include sensing at least one of the pressures, temperatures, or fan speeds associated with the evaporator.

As indicated by block 124, the method includes a step of sensing an input current associated with the compressor motor. The input current can be sensed using the sensor 36. Preferably, the input current, the evaporator load, and the compressor head pressure are sensed before and/or during start-up of the compressor motor.

As indicated by block 126, the method includes a step of controlling an expansion device in dependence upon the system pressure and the input current. Preferably, this step acts to regulate an orifice size of the expansion device to reduce the compressor had pressure during start up. Here, the orifice size is larger at start-up, and decreases in area as a function of the compressor head pressure, the evaporator load, the compressor noise, and/or the input current to the compressor.

Figure 7:
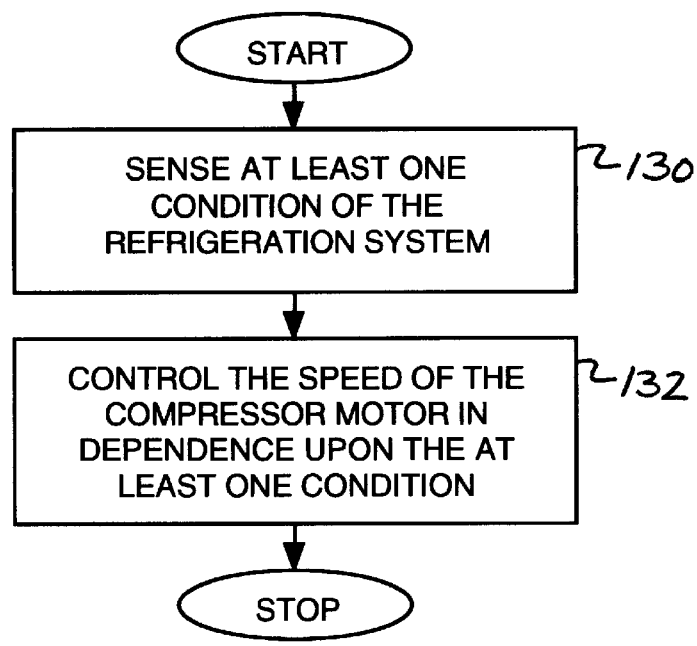
FIG. 7 is a flow chart of a fifth method of controlling a refrigeration system in accordance with the present invention.

FIG. 7 is a flow chart of a fifth method of controlling a refrigeration system in accordance with the present invention. As indicated by block 130, the method includes the step of sensing at least one condition of the refrigeration system. The at least one condition can include a system pressure such as the compressor head pressure, the evaporator load (including pressure, temperature, and fan speed), a condition of an expansion device, a temperature within the chamber, a humidity within the chamber, and/or an ambient temperature. Generally, the at least one condition can include any condition sensed using the various input devices described herein.

As indicated by block 132, the method includes a step of controlling the speed of the compressor motor in dependence upon the at least one condition. Here, it is preferred that the compressor motor include a two-speed motor, a multiple-speed motor or a variable-speed motor. The speed is controlled by a signal applied to the driver 40 in FIG. 2.

The speed of the compressor motor is varied to achieve at least one predetermined goal. The at least one predetermined goal can include any of the goals described with reference to FIG. 1.

Figure 8:
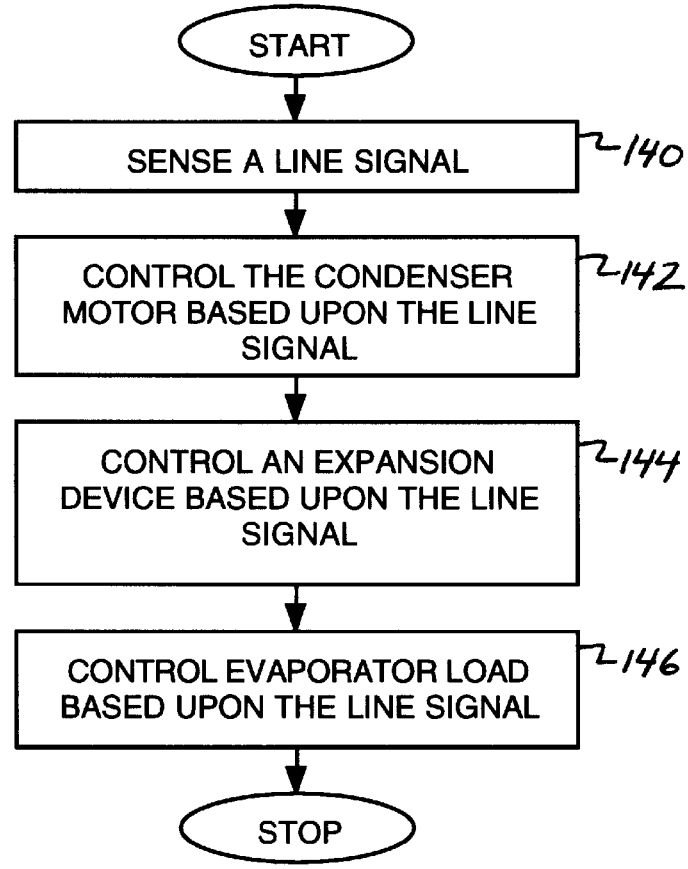
FIG. 8 is a flow chart of a sixth method of controlling a refrigeration system in accordance with the present invention.

FIG. 8 is a flow chart of a sixth method of controlling a refrigeration system in accordance with the present invention. As indicated by block 140, the method includes a step of sensing a line signal of a source which powers the refrigeration system. The line signal can be sensed using the line sensor 24 illustrated in FIG. 2. Preferably, the step of sensing the line signal includes sensing a magnitude of a line voltage as well as line current.

As indicated by block 142, the method includes controlling the condenser fan motor, prior to start-up of the compressor motor, to reduce the compressor head pressure based upon the line voltage. Here, it is preferred that an on-off decision for the condenser fan motor be controlled in dependence upon the line voltage. For example, the condenser fan can be controlled to be actuated for a duration inversely dependent upon the line voltage, prior to start-up of the compressor motor. Hence, at low line voltages, the condenser fan motor would run for a longer duration to reduce the compressor head pressure to its desired level prior to start-up.

As indicated by block 144, the method includes a step of controlling an expansion device based upon the line voltage or line current or both. Preferably, at least one dimension of the expansion device is controlled in inverse relation to the line voltage. Hence, the lower the line voltage, the greater the area which is commanded.

As indicated by block 146, the method includes a step of controlling a load to the evaporator in dependence upon the line signal. This step can be performed to reduce, and possibly minimize, the evaporator load for low line voltages.

Figure 9:
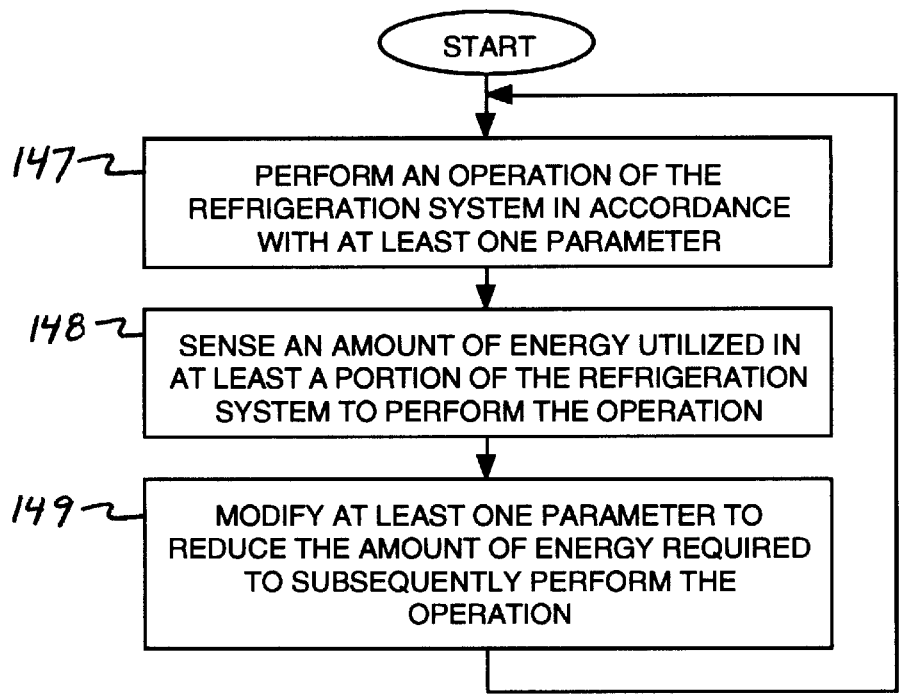
FIG. 9 is a flow chart of a seventh method of controlling a refrigeration system in accordance with the present invention.

FIG. 9 is a flow chart of a seventh method of controlling a refrigeration system in accordance with the present invention. As indicated by block 147, the method includes a step of performing an operation of the refrigeration system in accordance with at least one parameter. Examples of performing the operation include, but are not limited to, performing a refrigeration cycle and performing a defrost cycle.

The at least one parameter include parameters which define the refrigeration cycle and the defrost cycle. Examples of the at least one parameter include, but are not limited to, a speed of the condenser fan motor, a speed of the evaporator blower motor, and a speed of the compressor motor.

As indicated by block 148, the method further includes a step of sensing an amount of energy utilized in at least a portion of the refrigeration system to perform the operation. If desired, the amount of energy expended by the entire refrigeration system can be sensed. Here, the amount of energy can be sensed using the line sensor 24. Alternatively, the amount of energy expended by components specific to the operation can be sensed. Here, the amount of energy can be sensed using the sensors 36, 44, 52, and/or 62, for example.

As indicated by block 149, the method includes a step of modifying the at least one parameter to reduce an average power required to subsequently perform the operation. The average power can be defined in terms of a time duration between successive refrigeration cycles or successive defrost cycles.

Preferably, the at least one parameter is modified in accordance with an adaptive algorithm and/or a global optimization method for reducing the average power. Various univariate and multivariate global optimization methods can be utilized for this purpose. Alternatively, a fuzzy logic approach can be utilized to modify the at least one parameter.

Optionally, the at least one parameter is modified in dependence upon other quantities. These quantities can include, but are not limited to, a control volume thermal condition, an evaporator load, a dimension of the expansion device, and an ambient condition.

Adaptive operation as herein-described allows the refrigeration system to operate in a more efficient manner. Thus, the system can adjust its operation to optimize energy use as required by current conditions and usage, or allow short cycles of lower efficiency operation to accommodate short periods of different operating conditions (e.g. higher compressor speeds).

Figure 10:
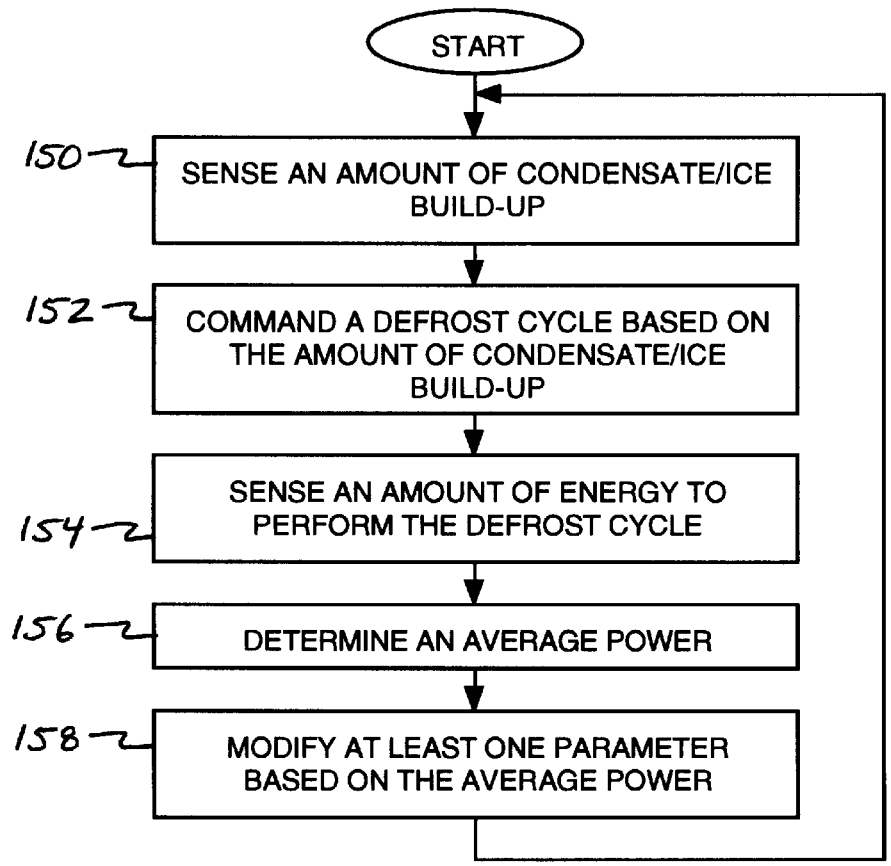
FIG. 10 is a flow chart of an eighth method of controlling a refrigeration system in accordance with the present invention.

FIG. 10 is a flow chart of an eighth method of controlling a refrigeration system in accordance with the present invention. As indicated by block 150, the method includes a step of sensing an amount of frozen build-up in the refrigeration system. The frozen build-up can include frozen condensate in the form of frost or ice in the chamber. The frozen build-up can be monitored using an optical sensor or a thermal sensor, for example. Alternatively, the frozen build-up can be monitored by sensing an impedance associated with the defrost bar. Here, for example, the frozen build-up can be monitored by either directly or indirectly sensing a resistance or a reactance of the defrost bar.

As indicated by block 152, the method includes a step of commanding a defrost cycle based upon the amount of frozen build-up in the refrigeration system. The defrost cycle is actuated by applying a suitable signal to the driver 64 for the defrost bar 66.

Typically, the defrost cycle is initiated once the amount of frozen build-up attains or exceeds a predetermined threshold. The defrost cycle can be terminated based upon an input current to the defrost bar 66 which indicates that a predetermined amount of the frozen build-up remains. The input current initially selected for terminating the defrost cycle can be selected from empirical defroster bar data of input current versus amount of frozen build-up. Here, for example, the input current which indicates 100% melting of the frozen build-up (i.e. no remaining frozen build-up) can be selected.

As indicated by block 154, the method includes a step of sensing an amount of energy required to perform the defrost cycle. As indicated by block 156, an average power is determined by dividing the amount of energy by a time duration between the defrost cycle performed in block 152 and a previous defrost cycle. The average power provides a measure of the average power required over the full operating time of the refrigeration system for performing defrost cycles.

As indicated by block 158, at least one parameter of the defrost cycle is modified in dependence upon the average power. Preferably, the at least one parameter is modified to reduce the average power. The at least one parameter can include the predetermined threshold at which the defrost cycle is initiated, and the input current to the defrost bar which signals that the defrost cycle is to be terminated.

Preferably, the at least one parameter is modified in accordance with an adaptive algorithm and/or a global optimization method for minimizing the average power. Various univariate and multivariate global optimization methods can be utilized for this purpose.

Flow of the routine is directed back to block 150. Thereafter, a subsequent defrost cycle in block 152 is performed in accordance with the new at least one parameter selected in block 158.

The above-described method is advantageous in reducing the average power required for performing defrost cycles. Further, the above-described method can eliminate the requirement of a defrost timer and a seasonal defrost switch in the refrigeration system.

Figure 11:
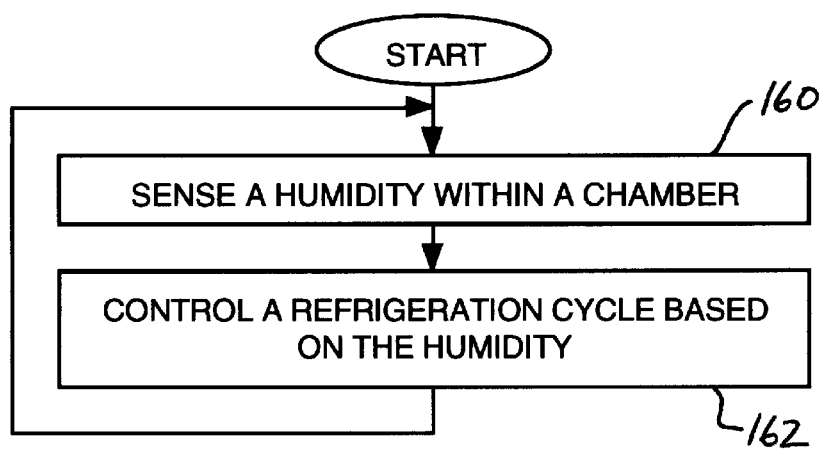
FIG. 11 is a flow chart of a ninth method of controlling a refrigeration system in accordance with the present invention.

FIG. 11 is a flow chart of a ninth method of controlling a refrigeration system in accordance with the present invention. As indicated by block 160, the method includes a step of sensing a humidity within a chamber. The humidity can be sensed using the sensor 62 associated with the defrost bar 66 using empirical data. The empirical data can be represented by a look-up table or by a fitted curve. Here, the humidity can be determined using a wet bulb temperature method or by sensing a pulse power associated with the defrost bar 66. Alternatively, a dedicated humidity sensor can be utilized to sense the humidity.

Sensing the humidity level provides information about the specific heat of the air being cooled. As a result, the cooling time, the cooling rate, or both can be modified accordingly to improve system performance.

As indicated by block 162, the method includes a step of controlling a refrigeration cycle based upon the humidity. In a preferred embodiment, the step of controlling the refrigeration cycle includes controlling a speed of the compressor motor and controlling a duration of the refrigeration cycle based upon the humidity. For example, the speed and the duration can be controlled to reduce the energy used by the compressor motor in dependence upon the humidity. As a result, less compressor energy is expended for lower humidity levels.

In one embodiment, the power applied to the compressor motor is decreased in steps for step-wise decreases in the humidity. The steps in humidity can be in the range of 5% to 10%, for example.

The refrigeration cycle can be controlled to maintain fluctuations in the temperature within a predetermined range to prolong the life of the contents within the chamber. Further, a reduced cooling rate can be commanded to reduce the amount of moisture removed from the air in the chamber. This also acts to lengthen the usable life of the contents of the chamber.

Flow of the routine is directed back to block 160 to perform further refrigeration cycles. The above-described method advantageously reduces the energy required to perform a refrigeration cycle, and extends the life of the compressor motor by operating it at a reduced pressure.

It is noted that different chambers in the refrigeration system may require different temperature/humidity levels. In this case, separate monitoring and control steps can be performed for each of the chambers.

Figure 12:
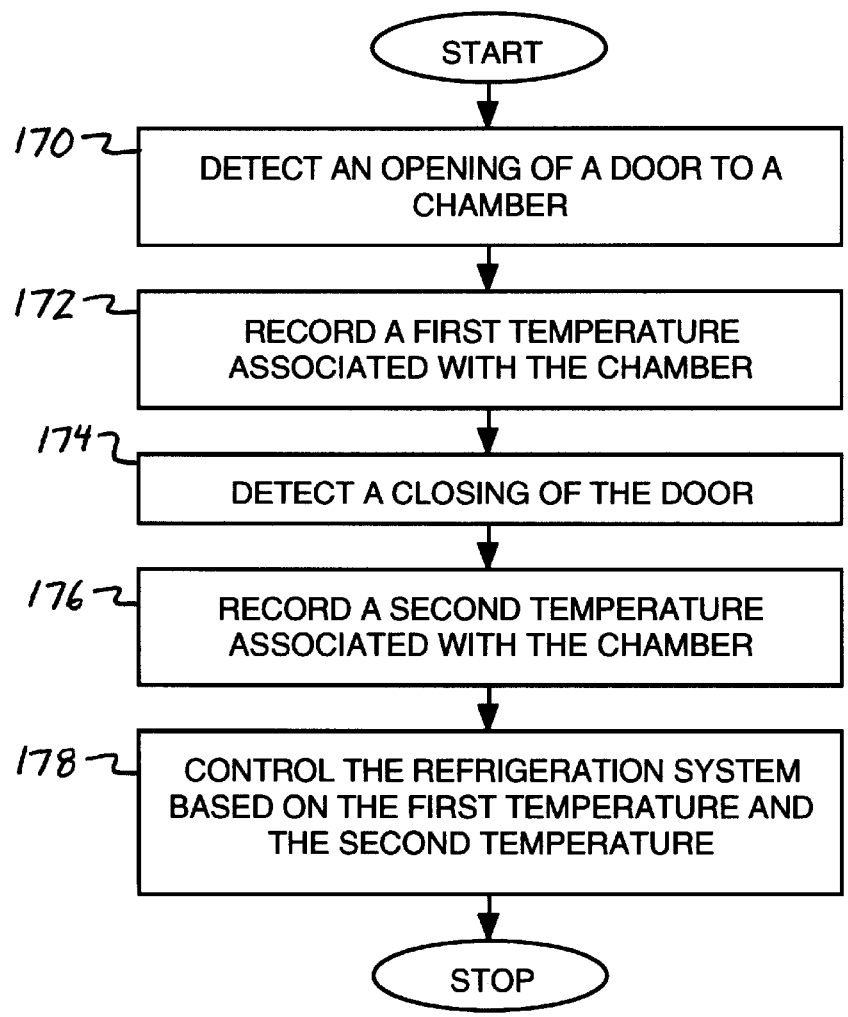
FIG. 12 is a flow chart of a tenth method of controlling a refrigeration system in accordance with the present invention.

FIG. 12 is a flow chart of a tenth method of controlling a refrigeration system. As indicated by block 170, the method includes a step of detecting an opening of a door to a chamber of the refrigeration system. The opening of the door can be detected by a switch, such as the first switch 32 and the second switch 34 illustrated in FIG. 2. Upon detecting the opening of the door, a step of recording a first temperature within the chamber is performed as indicated by block 172. The first temperature is sensed by the temperature sensor 30.

As indicated by block 174, the method includes a step of detecting a closing of the door. The closing of the door can also be detected using the switch described with reference to block 170. Upon detecting the closing of the door, a step of recording a second temperature within the chamber is performed as indicated by block 176. The second temperature is sensed by the temperature sensor 30.

As indicated by block 178, the method includes a step of controlling the refrigeration system based upon the first temperature and the second temperature. In a preferred embodiment, this step includes determining either a difference or a rate of change between the first temperature and the second temperature to determine a characteristic of the contents of the chamber. The rise in temperature, from the first temperature to the second temperature, provides an indication of the contents within the chamber (i.e. how full the chamber is).

The step of controlling the refrigeration system can further include controlling the compressor motor in dependence upon the temperature difference or rate. Controlling the compressor motor can include determining a duration over which the compressor motor is to be actuated to cool the chamber back to a desired temperature, and determining whether the compressor motor can be run in a higher-efficiency mode at a lesser capacity for a longer duration.

The methods taught in FIG. 11 and FIG. 12 can be used simultaneously to provide an additional means of cycle control.

It is noted that various combinations of the above-described methods can be performed to control a refrigeration system. If desired, a refrigeration system can utilize all of the methods described herein.

Thus, there has been described herein several embodiments, including preferred embodiments, of methods and systems for controlling a refrigeration system.

The various embodiments of the present invention advantageously achieve one or more predetermined goals of operation for a refrigeration system by making measurements of specific parameters that relate to the operation of the system, and by modifying operating parameters of the system in dependence thereupon.

While the best mode for carrying out the invention has been described in detail, those familiar with the art to which this invention relates will recognize various alternative designs and embodiments for practicing the invention as defined by the following claims.

What is claimed is:

1. A method for controlling a refrigeration system, the method comprising the steps of:

performing an operation of the refrigeration system in accordance with at least one parameter;

sensing an amount of energy utilized in at least a portion of the refrigeration system to perform the operation;

modifying the at least one parameter based on the sensed amount of energy to reduce an average power required to subsequently perform the operation;

wherein the at least one parameter includes a speed of an evaporator blower motor.

2. A method for controlling a refrigeration system, the method comprising the steps of:

performing an operation of the refrigeration system in accordance with at least one parameter;

sensing an amount of energy utilized in at least a portion of the refrigeration system to perform the operation;

modifying the at least one parameter based on the sensed amount of energy to reduce an average power required to subsequently perform the operation;

wherein the at least one parameter includes a speed of a condenser fan motor.

3. A method for controlling a refrigeration system, the method comprising the steps of:

performing an operation of the refrigeration system in accordance with at least one parameter;

sensing an amount of energy utilized in at least a portion of the refrigeration system to perform the operation;

modifying the at least one parameter based on the sensed amount of energy to reduce an average power required to subsequently perform the operation;

wherein the step of performing the operation includes performing a defrost cycle.

4. The method of claim 3 wherein the average power is determined based upon a duration between successive defrost cycles.

5. A method for controlling a refrigeration system, the method comprising the steps of:

performing an operation of the refrigeration system in accordance with at least one parameter;

sensing an amount of energy utilized in at least a portion of the refrigeration system to perform the operation;

wherein the step of performing the operation includes performing a refrigeration cycle;

wherein the average power is based upon a time duration between successive refrigeration cycles.

6. A system for controlling a refrigeration system, the system comprising:

means for performing an operation of the refrigeration system in accordance with at least one parameter;

a sensor for sensing an amount of energy utilized in at least a portion of the refrigeration system to perform the operation;

means for modifying the at least one parameter based on the sensed amount of energy to reduce an average power required to subsequently perform the operation;

wherein the at least one parameter includes a speed of an evaporator blower motor.

7. A system for controlling a refrigeration system, the system comprising:

means for performing an operation of the refrigeration system in accordance with at least one parameter;

a sensor for sensing an amount of energy utilized in at least a portion of the refrigeration system to perform the operation;

means for modifying the at least one parameter based on the sensed amount of energy to reduce an average power required to subsequently perform the operation;

wherein the at least one parameter includes a speed of a condenser fan motor.

8. A system for controlling a refrigeration system, the system comprising:

means for performing an operation of the refrigeration system in accordance with at least one parameter;

a sensor for sensing an amount of energy utilized in at least a portion of the refrigeration system to perform the operation;

means for modifying the at least one parameter based on the sensed amount of energy to reduce an average power required to subsequently perform the operation;

wherein the means for performing the operation includes means for performing a defrost cycle.

9. A system for controlling a refrigeration system, the system comprising:

means for performing an operation of the refrigeration system in accordance with at least one parameter;

a sensor for sensing an amount of energy utilized in at least a portion of the refrigeration system to perform the operation;

means for modifying the at least one parameter based on the sensed amount of energy to reduce an average power required to subsequently perform the operation;

wherein the average power is determined based upon a time duration between successive defrost cycles.

* * * * *